United States Patent
Choi

(10) Patent No.: US 12,515,519 B2
(45) Date of Patent: Jan. 6, 2026

(54) ELECTRONIC ACCELERATION DEVICE INCLUDING VEHICLE SUDDEN UNINTENDED ACCELERATION PREVENTION MEANS, AND METHOD FOR PREVENTING SUDDEN UNINTENDED ACCELERATION USING SAME

(71) Applicant: Jaeyoung Choi, Changwon-si (KR)

(72) Inventor: Jaeyoung Choi, Changwon-si (KR)

( * ) Notice: Subject to any disclaimer, the term of this patent is extended or adjusted under 35 U.S.C. 154(b) by 386 days.

(21) Appl. No.: 18/015,921

(22) PCT Filed: May 27, 2021

(86) PCT No.: PCT/KR2021/006577
§ 371 (c)(1),
(2) Date: Jan. 12, 2023

(87) PCT Pub. No.: WO2022/014854
PCT Pub. Date: Jan. 20, 2022

(65) Prior Publication Data
US 2023/0286380 A1 Sep. 14, 2023

(30) Foreign Application Priority Data

Jul. 13, 2020 (KR) .......................... 10-2020-0085789

(51) Int. Cl.
*B60K 28/10* (2006.01)
*B60R 16/03* (2006.01)
*G07C 5/08* (2006.01)

(52) U.S. Cl.
CPC .............. *B60K 28/10* (2013.01); *B60R 16/03* (2013.01); *G07C 5/0816* (2013.01)

(58) Field of Classification Search
CPC ...... B60K 28/10; B60K 26/02; B60K 26/021; B60R 16/03; B60R 16/023; G07C 5/0816;
(Continued)

(56) References Cited

U.S. PATENT DOCUMENTS 7,119,506 B1 10/2006 Kamiya

FOREIGN PATENT DOCUMENTS

| CN | 105699741 A | * | 6/2016 |
| JP | 2004-350415 A | | 12/2004 |

(Continued)

OTHER PUBLICATIONS

English translation of Zhang et al. (CN 105699741) (Year: 2016).*
English translation of Ahn (KR 100715105) (Year: 2007).*
English translation of Lee (KR 102077802) (Year: 2020).*

*Primary Examiner* — Kyle J Kingsland
(74) *Attorney, Agent, or Firm* — Maschoff Brennan

(57) ABSTRACT

This invention contains the electronic control unit as well as the first accelerator pedal sensor and the second accelerator pedal sensor which are connected to the above-said electronic control unit and whose signal outputs vary according to the angle of the accelerator of the vehicle. The above said first accelerator pedal sensor is supplied with power from the electronic control unit through a first input power supply, and divide the voltage at the first variable resistor into the first output signal and the first source power (0V). On the other hand, the second accelerator pedal sensor is supplied the power from the above-said electronic control unit through the second input power supply, and divide the voltage at the second variable resistor into the second output signal and the second source power (0 V).

1 Claim, 3 Drawing Sheets

(58) Field of Classification Search
CPC ........... B60W 2540/10; B60Y 2306/15; B60Y 2400/3086

See application file for complete search history.

(56) References Cited

FOREIGN PATENT DOCUMENTS

| | | | |
|---|---|---|---|
| JP | 2006-025470 | A | 1/2006 |
| JP | 2012-117377 | A | 6/2012 |
| KR | 2000-0013671 | A | 3/2000 |
| KR | 100715105 | B1 * | 5/2007 |
| KR | 102077802 | B1 * | 2/2020 |

* cited by examiner

[FIG. 1]
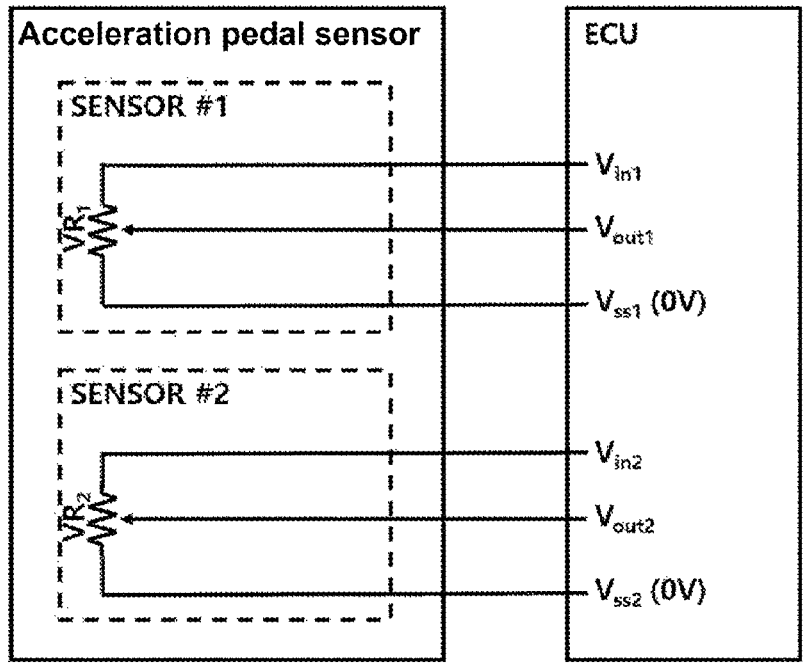
[FIG. 2]
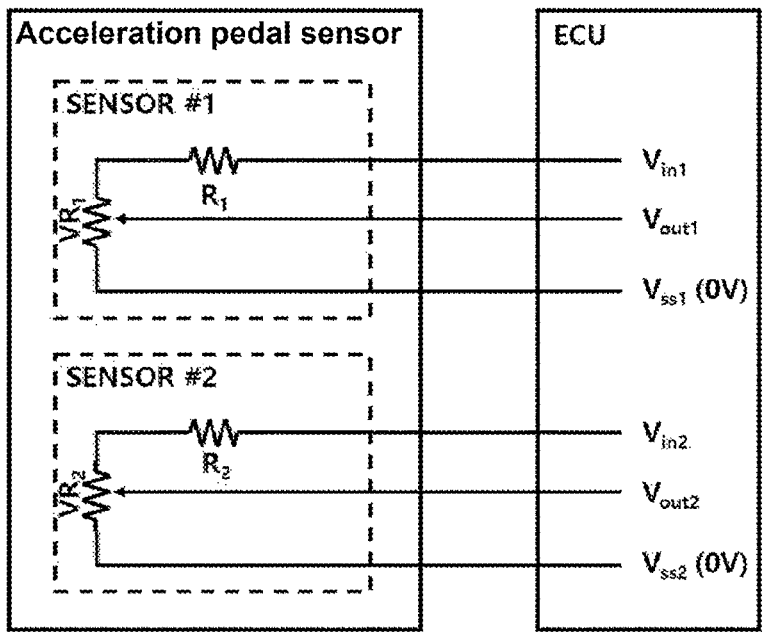

[FIG. 3]

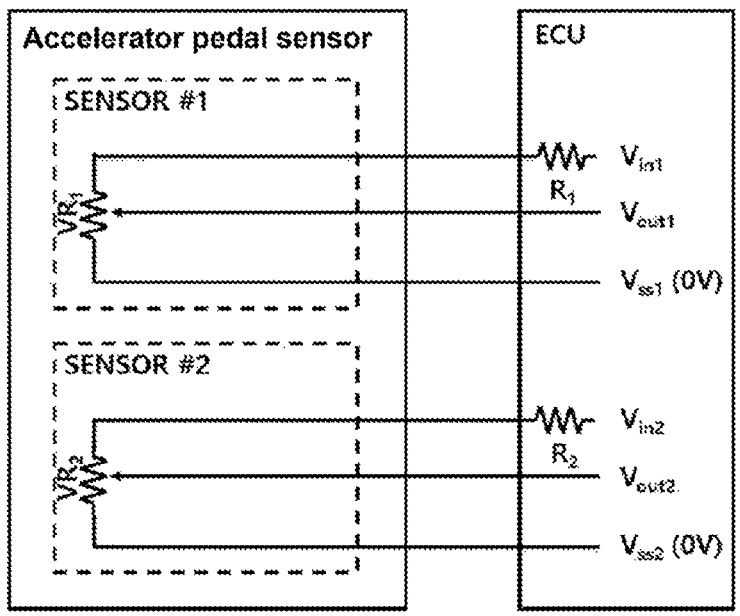

[FIG. 4]

Stage 1: the maximum first output signal ($V_{out1}$, max) having the voltage lower than the voltage ($V_{in1}$) of the first input power source due to the above said first added resistor is determined as the first reference value when the first accelerator pedal sensor normally operates. On the other hand, the second maximum second output signal ($V_{out2}$, max) having lower voltage than the voltage ($V_{in2}$) of the above-said second input power due to the above-said second added resistor is determined as the second reference value when the above-said second accelerator pedal sensor normally operates;

Stage 2: The first output signal (Vout1) generated during operation of the above-said first accelerator pedal sensor and the second output signal (Vout2) generated during operation of the above-said second accelerator pedal sensor are compared with the first reference values (Vout1, max) and the second output signal (Vout2, max) respectively;

Stage 3: when the above-said first output signal (Vout1) and the above-said second output signal (Vout2) are greater than the first reference values (Vout1, max) and the second reference values (Vout2, max), respectively, the electronic control unit changes the driving state of the vehicle to low-speed mode and generates the fault signal.

[FIG. 5]
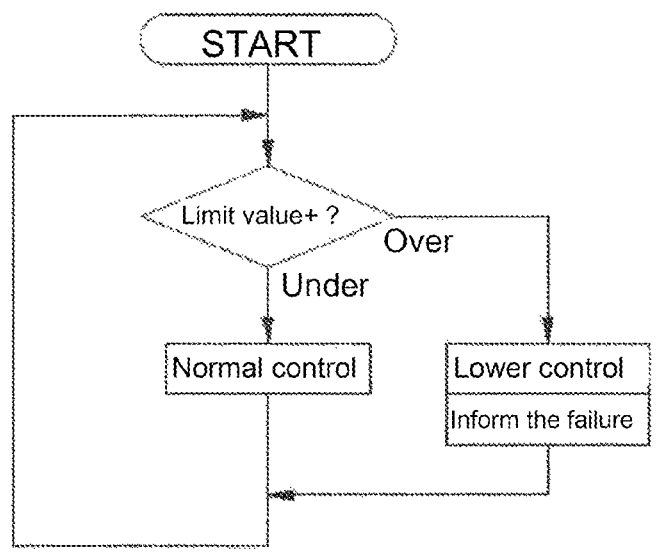

ELECTRONIC ACCELERATION DEVICE INCLUDING VEHICLE SUDDEN UNINTENDED ACCELERATION PREVENTION MEANS, AND METHOD FOR PREVENTING SUDDEN UNINTENDED ACCELERATION USING SAME

TECHNICAL FIELD

This invention concerns an electronic accelerator including the vehicle's sudden unintended acceleration ("SUA") prevention device and the SUA prevention method using the same.

BACKGROUND TECHNOLOGY

The accelerator pedal position sensor is one of the most critical components of the electronic accelerator. The accelerator pedal position sensor transmits how much the driver depresses the accelerator pedal to the Electronic Control Unit (ECU) to control the speed of the vehicle.

As the failure of accelerator pedal position sensor may lead to a major accident, the sensor is composed of the first accelerator pedal sensor (SENSOR #1) and the second accelerator pedal sensor (SENSOR #2) as shown in FIG. 1. When power is supplied from the input power source ($V_{in1}$, $V_{in2}$) to the first accelerator pedal sensor (SENSOR #1) and the second accelerator pedal sensor (SENSOR #2), the voltage is divided while passing through the variable resistors ($VR_1$, $VR_2$) and the resulting output signals $V_{out1}$ and $V_{out2}$ are detected at ECU. At this time, if the first accelerator pedal sensor (SENSOR #1) determines the fuel injection volume and injection timing, the second accelerator pedal sensor (SENSOR #2) checks out whether the first accelerator pedal sensor (SENSOR #1) is normally operating. For example, in case when the same voltage is supplied to the first accelerator pedal sensor (SENSOR #1) and the second accelerator pedal sensor (SENSOR #2) ($V_{in1}=V_{in2}$), and when the second variable resistor VR2 has two times of variable resistance which the first variable resistor (VR-1) has, the wave forms of the output signals $V_{out1}$ and $V_{out2}$ are the same, but the second output signal ($V_{out2}$) should be a half of the magnitude of the first output signal ($V_{out1}$). However, if the second output signal ($V_{out2}$) does not satisfy the requirement of it having a half of the magnitude of the first output signal ($V_{out1}$), the ECU assumes that a failure has occurred in the accelerator pedal sensor and switches the mode to the low-speed operation mode before displaying the failure and actively informing the driver of the failure.

The accelerator pedal sensor uses a variable resistor which often fails due to wear, corrosion, or damage over time. The most serious problem happens when a disconnection occurs in the lines connected to Vss (0V) of both the first accelerator pedal sensor (SENSOR #1) and the second accelerator pedal sensor (SENSOR #2). If the disconnection happens in the line connected to Vss (0 V), the input voltage is recognized as the output signal as it is. When the line connected to Vss (0V) of either the first accelerator pedal sensor SENSOR #1 or the second accelerator pedal sensor #2 is disconnected, the requirement of the second output signal (Vout2) becoming the half of magnitude of the first output signal is not satisfied, thus resulting in ECU making the faulty assumption that the accelerator pedal sensor has problem.

However, in a very rare case, if a disconnection occurs in the lines connected to Vss (0V) of the first accelerator pedal sensor (SENSOR #1) and the second accelerator pedal sensor (SENSOR #2) at the same time, the requirement of making the second output signal ($V_{out1}$) being the half of the magnitude of the first output signal ($V_{out1}$) is still met, which leads to ECU not being able to detect a failure. Especially, as the input voltage ($V_{in1}$) is supplied as the output signal ($V_{out1}$) without any change due to the disconnection in the line connected to Vss (0V) of the first accelerator pedal sensor #1, that becomes the cause of SUA.

The SUA very rarely happens. But whenever it happens, it often leads to big accident. There is a need for a method of preventing SUA from happening even when the disconnection occurs in the lines connected to both Vss (0 V) of the first accelerator pedal sensor (SENSOR #1) and that of the second accelerator pedal sensor (SENSOR #2).

DETAILED DESCRIPTION OF THE INVENTION

[Technical Task]

The first objective of this invention is to provide the customers with the electronic accelerator including the vehicle SUA prevention means and a method for preventing SUA using the same even when there are disconnections in the lines connected to Vss (0 V) of the first accelerator pedal sensor (SENSOR #1) and the second accelerator pedal sensor (SENSOR #2) at the same time.

Technical Solution

In order to solve the above problem, the electronic acceleration device of this invention, including the Vehicle SUA prevention means, as shown in the implementation example, contains the electronic control unit, and the first accelerator pedal sensor and the second accelerator pedal sensor which are connected to the electronic control unit, and whose output signals vary depending on the angle of the accelerator of the vehicle. The above said first accelerator pedal sensor is supplied with power from the electronic control unit through the first input power supply, and divide the voltage at the first variable resistor into the first output signal and the first source power (0V) while the second accelerator pedal sensor is supplied the power from the above-said electronic control unit through the second input power supply, and divide the voltage at the second variable resistor into the second output signal and the second source power (0 V). The first added resistor is installed between the above-said first input power supply and the above-said first variable resistor, while the second added resistor is installed between the above-said second input power supply and the above-said second variable resistor.

The implementation example is characterized by the fact that the voltage of the power supplied to the first input power is the same as that supplied to the second input power and that the ratio (VR1/VR2) of the resistance value VR1 of the first variable resistor over the resistance value VR2 of the second variable resistor is the same with the ratio (R1/R2) of the resistance value R1 of the first added resistor over the resistance value R2 of the second added resistor.

The vehicle SUA method described in another implementation example for the solution of the problems above is the use of the vehicle SUA prevention means described in details. It is made of several stages; Stage 1: the maximum first output signal ($V_{out1}$, max) having the voltage lower than the voltage ($V_{in1}$) of the first input power source due to the above said first added resistor is determined as the first reference value when the first accelerator pedal sensor normally operates. On the other hand, the second maximum second output signal ($V_{out2}$, max) having lower voltage than the voltage ($V_{in2}$) of the above-said second input power due to the above-said second added resistor is determined as the second reference value when the above-said second accelerator pedal sensor normally operates; Stage 2: The first output signal ($V_{out1}$) generated during operation of the above-said first accelerator pedal sensor and the second output signal ($V_{out2}$) generated during operation of the above-said second accelerator pedal sensor are compared with the first reference values ($V_{out1}$, max) and the second output signal ($V_{out2}$, max) respectively; Stage 3: when the above-said first output signal ($V_{out1}$) and the above-said second output signal ($V_{out2}$) are greater than the first reference values ($V_{out1}$, max) and the second reference values ($V_{out2}$, max), respectively, the electronic control unit changes the driving state of the vehicle to low-speed mode and generates the fault signal.

Effect of Invention

In the example of this invention, as for the electronic acceleration device including the Vehicle SUA prevention means, the first added resistor is installed between the first input power and the first variable resistor at the first accelerator pedal sensor, while the second added resistor is installed between the second input power source and the second variable resistor at the second accelerator pedal sensor.

Accordingly, in the example of this invention, the electronic acceleration device including the Vehicle SUA prevention means determines the maximum first output signal ($V_{out1}$, max) having lower voltage than the voltage ($V_{in1}$) of the first input power due to the first added resistor as the second reference value and then, determine the maximum second output signal ($V_{out2}$, max) having a voltage lower than the voltage ($V_{in2}$) of the above said second input power source due to the second added resistor as the second reference value.

Therefore, when disconnection occurs in the lines connected to Vss (0V) of the first accelerator pedal sensor SENSOR #1 and the second accelerator pedal sensor SENSOR #2 at the same time, the first output signal ($V_{out1}$) and the second output signal ($V_{out2}$) get the values greater than the first reference value ($V_{out1}$, max) and the second reference value ($V_{out2}$, max), respectively. in this case, the electronic control unit judges it as a failure and operates in a low speed mode and generates the failure signal. This process can prevent a SUA in advance in the conventional electronic accelerator which cannot judge it as a failure.

BRIEF DESCRIPTION OF DIAGRAM

FIG. 1 is a schematic circuit diagram of a conventional electronic accelerator.

FIG. 2 is a schematic circuit diagram of an electronic acceleration device including Vehicle SUA prevention means of the first implementation of this invention.

FIG. 3 is a schematic circuit diagram of an electronic acceleration device including Vehicle SUA prevention means of the second implementation of this invention.

FIGS. 4 and 5 are schematic flowcharts of SUA prevention method in another implementation example of this invention.

The attached diagrams are just the references to help you to understand the technology of this invention and they do not limit the scope of the rights of this invention.
[Best Form for the Implementation of this Invention]

For the practice of this invention, this invention contains the electronic control unit as well as the first accelerator pedal sensor and the second accelerator pedal sensor which are connected to the above-said electronic control unit and whose signal outputs vary according to the angle of the accelerator of the vehicle. The first accelerator pedal sensor receives power from the above-said electronic control unit through the first input power, and divides the voltage at the first variable resistor to the first output signal and the first source power (0 V) while the second accelerator pedal sensor receives power from the above-said electronic control unit through the second input power, and divides the voltage at the second variable resistor to the second output signal and the second source power (0 V). The first added resistor is installed between the above-said first input power and the above-said first variable resistor and the second added resistor is installed between the above-said second input power and the above-said second variable resistor. In addition, the voltage coming from the above-said first input power is equal to that coming from the above-said second input power. The ratio (VR1/VR2) of the above-said first resistance value (VR1) over the above-said second variable resistor of the resistance value (VR2) is equal to the ratio (R1/R2) of the resistance value (R1) of the first added resistor over the resistance value (R2) of the above-said second added resistor. This invention of vehicle SUA prevention means is characterized by the above.
[Form for the Implementation of the Invention]

This invention contains the electronic control unit as well as the first accelerator pedal sensor and the second accelerator pedal sensor which are connected to the above-said electronic control unit and whose signal outputs vary according to the angle of the accelerator of the vehicle. The first accelerator pedal sensor receives power from the above-said electronic control unit through the first input power, and divides the voltage at the first variable resistor to the first output signal and the first source power (0 V) while the second accelerator pedal sensor receives power from the above-said electronic control unit through the second input power, and divides the voltage at the second variable resistor to the second output signal and the second source power (0 V). The first added resistor is installed between the above-said first input power and the above-said first variable resistor while the second added resistor is installed between the above-said second input power and the above-said second variable resistor. In addition, the voltage coming from the above-said first input power is equal to that coming from the above-said second input power. The ratio ($VR_1/VR_2$) of the above-said first resistance value ($VR_1$) over the above-said second variable resistor of the resistance value ($VR_2$) is equal to the ratio ($R_1/R_2$) of the resistance value ($R_1$) of the first added resistor over the resistance value ($R_2$) of the above-said second added resistor. This invention of vehicle SUA prevention means contains all of them above; Stage 1: The maximum first output signal (Vout1, max) having the voltage lower than the voltage (Vin1) of the first input power source due to the above-said first added resistor is determined as the first reference value When the first accelerator pedal sensor normally operates. On the other hand, when the above-said second accelerator pedal sensor normally operates, the second maximum second output signal (Vout2, max) having lower voltage than the voltage (Vin2) of the above-said second input power due to the above-said second added resistor is determined as the second reference value; Stage 2: The first output signal (Vout1) generated during operation of the above-said first accelerator pedal sensor and the second output signal (Vout2) generated during operation of the above-said second accelerator pedal sensor are compared with the first reference values (Vout1, max) and the second output signal (Vout2, max) respectively; Stage 3: when the above-said first output signal (Vout1) and the above-said second output signal (Vout2) are greater than the first reference values (Vout1, max) and the second reference values (Vout2, max), respectively, the electronic control unit changes the driving state of the vehicle to low-speed mode and generates the fault signal. This invention provides the vehicle SUA prevention method including these stages above.

The invention claimed is:

1. An electronic acceleration device including vehicle sudden unintended acceleration prevention means, comprising:
   an electronic control unit;
   a first accelerator pedal sensor and a second accelerator pedal sensor which are connected to the electronic control unit, wherein signal outputs from the first accelerator pedal sensor and the second accelerator pedal sensor vary according to an angle of an accelerator of a vehicle;
   wherein the first accelerator pedal sensor receives power from the electronic control unit through a first input power, and divides a voltage at a first variable resistor to a first output signal and a first source power (0 V);
   wherein the second accelerator pedal sensor receives power from the electronic control unit through a second input power, and divides a voltage at a second variable resistor to a second output signal and a second source power (0 V);
   wherein a first added resistor is installed between the first input power and the first variable resistor;
   wherein a second added resistor is installed between the second input power and the second variable resistor;
   wherein a voltage at the first input power is equal to a voltage at the second input power, and a ratio (VR1/VR2) is equal to a ratio (R1/R2);
   wherein VR1 is a resistance value of the first variable resistor,
   VR2 is a resistance value of the second variable resistor,
   R1 is a resistance value of the first added resistor, and
   R2 is a resistance value of the second added resistor.

* * * * *